Aug. 3, 1965
R. B. SKROMME
3,198,106
AGRICULTURAL IMPLEMENT
Filed Sept. 18, 1963
4 Sheets-Sheet 1
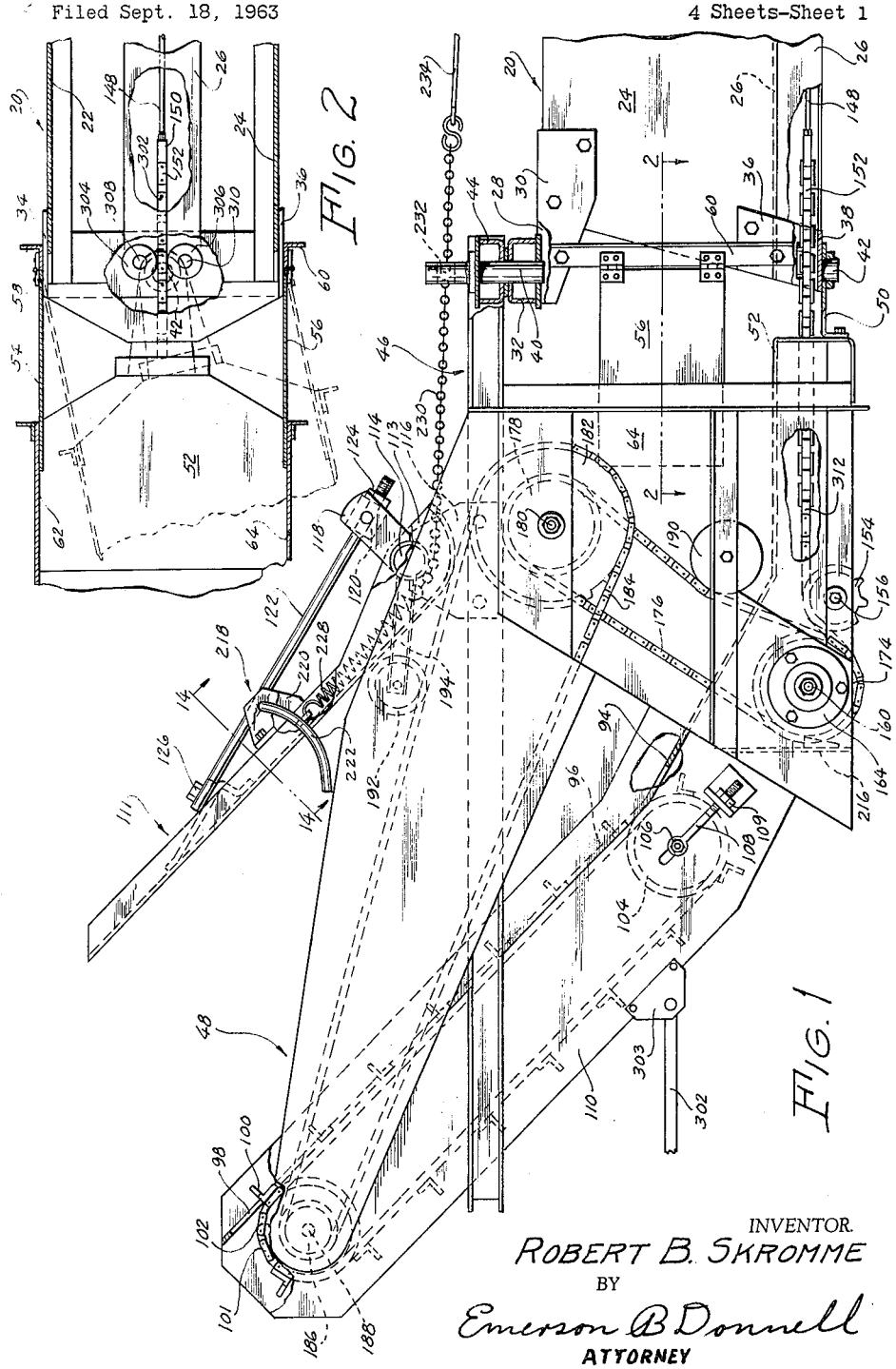
INVENTOR.
ROBERT B. SKROMME
BY
Emerson B Donnell
ATTORNEY

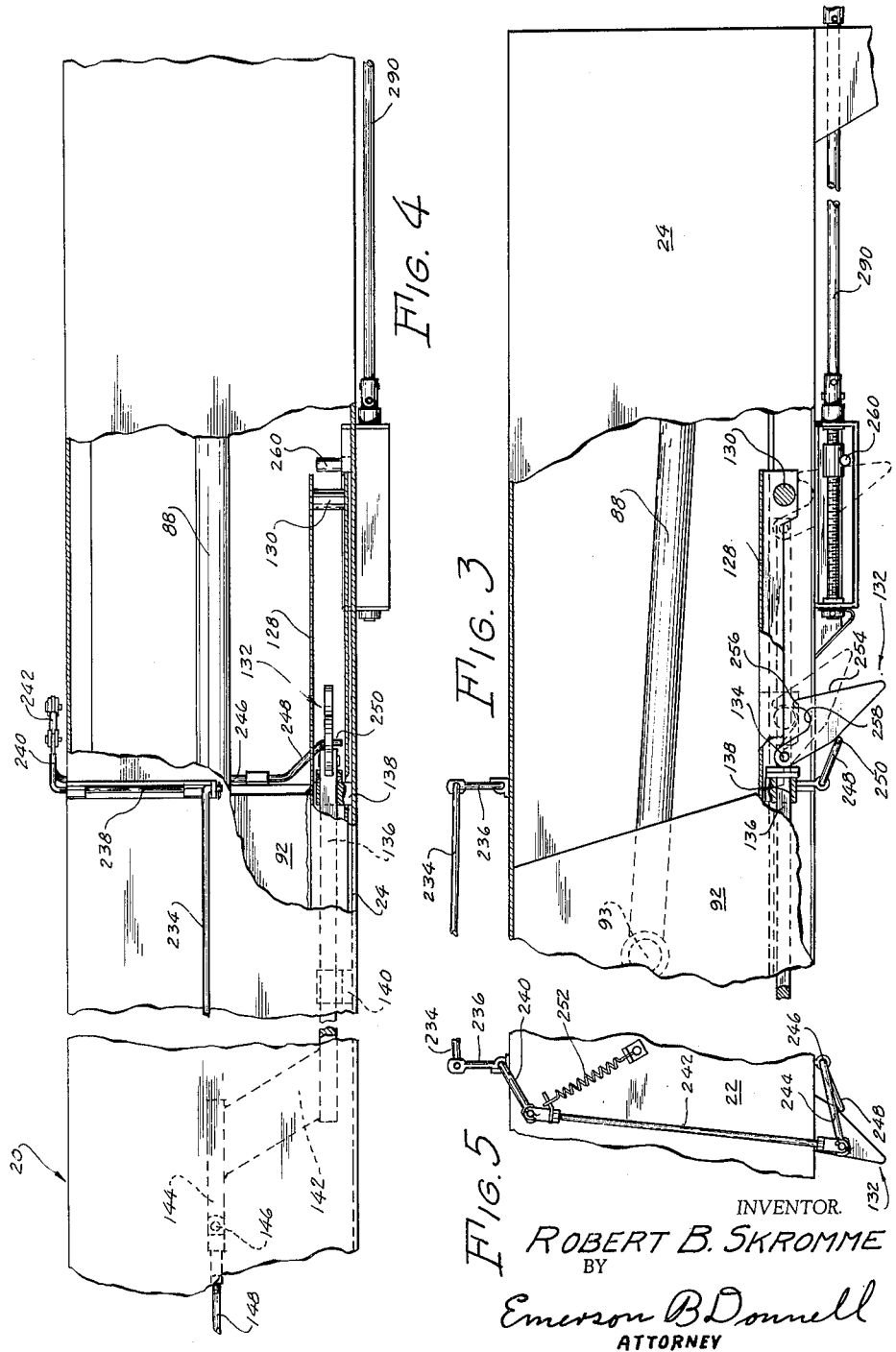

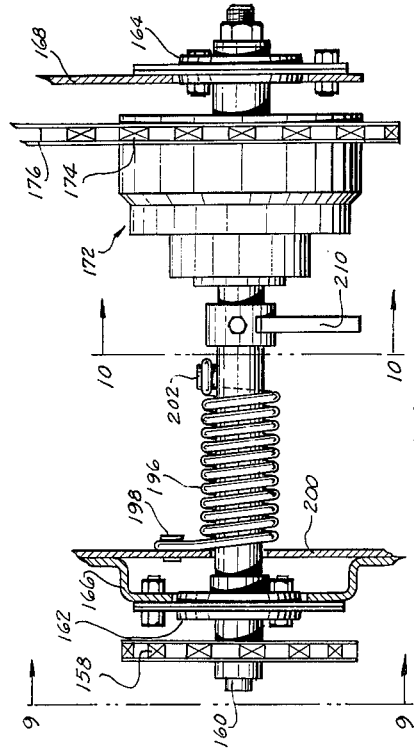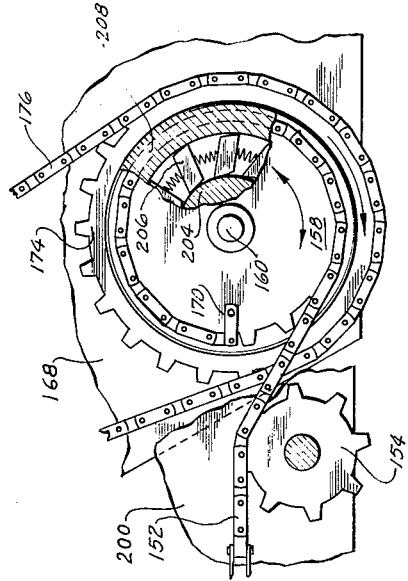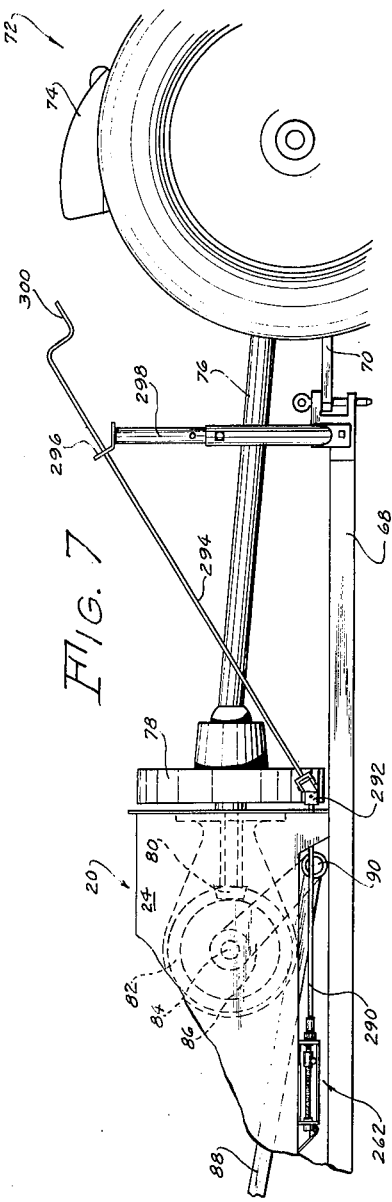

Aug. 3, 1965     R. B. SKROMME     3,198,106
AGRICULTURAL IMPLEMENT
Filed Sept. 18, 1963     4 Sheets-Sheet 4
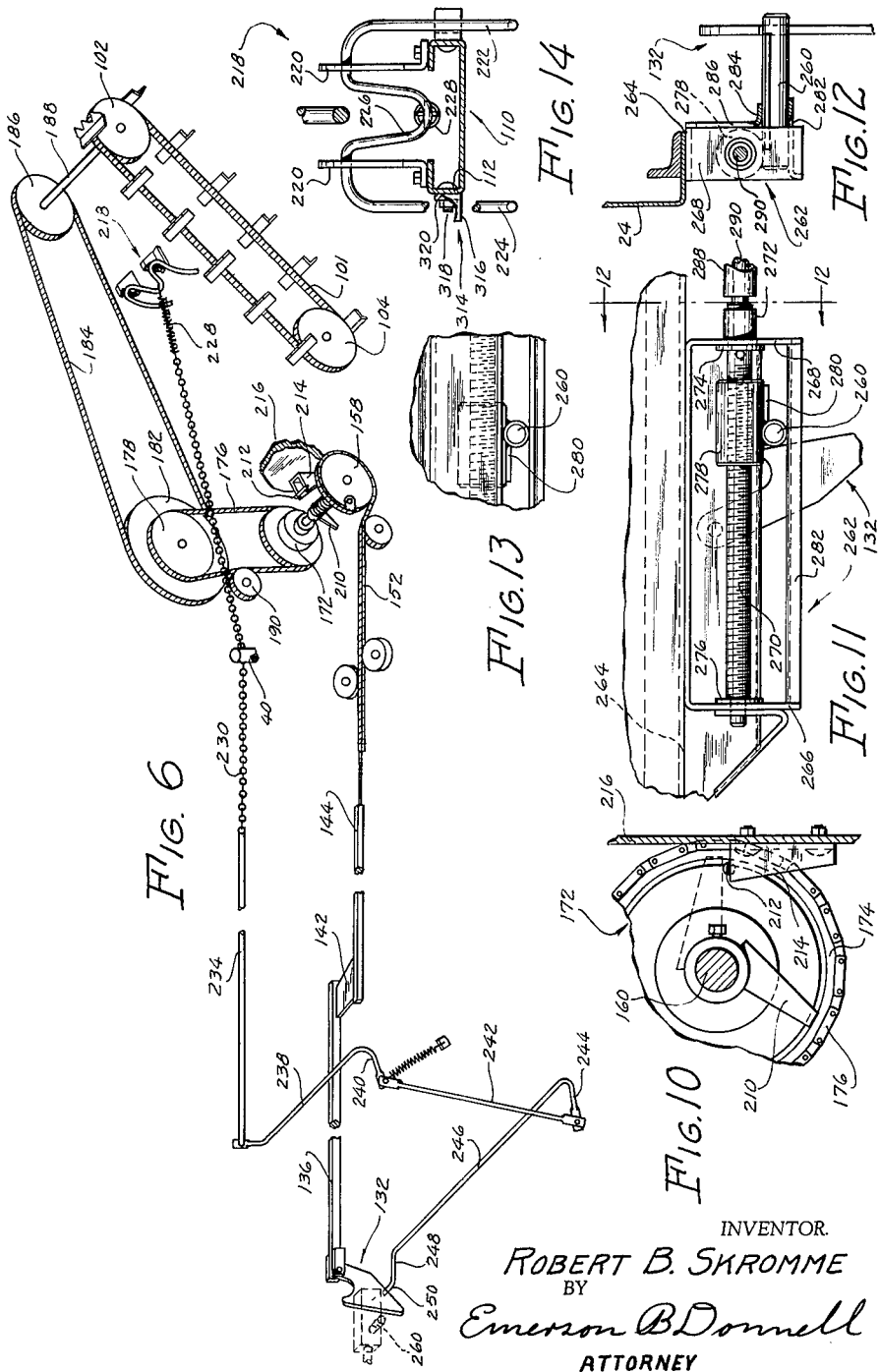
INVENTOR.
ROBERT B. SKROMME
BY
Emerson B Donnell
ATTORNEY United States Patent Office 3,198,106
Patented Aug. 3, 1965

3,198,106
AGRICULTURAL IMPLEMENT
Robert B. Skromme, Elmhurst, Ill., assignor to J. I. Case Company, Racine, Wis., a corporation of Wisconsin
Filed Sept. 18, 1963, Ser. No. 309,671
13 Claims. (Cl. 100—188)

The present invention relates to mechanism for throwing or tossing bales of hay or similar material, and particularly to such apparatus for throwing bales from a baler directly into a wagon or the like trailing behind a baler, and variously known in the trade as bale throwers, bale launchers, etc., and an object of the invention is to generally improve devices of this class.

Prior devices of this kind have been heavy and cumbersome and have required complicated power trains from the baler or the tractor; and even in some embodiments, a separate engine, all of which has added undesirable excess weight to the rear end of the baler, and also added to the cost of the device and to the expense of its operation.

Certain of these devices have been arranged to operate continuously, even though there was need for them only for an instant, whenever, a bale was finished, for example on the order of once a minute. Thus, the device would be running continuously throughout the entire baling operation, whereas it was actually used for only a small fraction of that time. Furthermore, some types of bale throwers have tended to cause damage to the bales, and some have afforded little control over the trajectory of the bales and are undesirable for this reason, either alone or in addition to their other disadvantages.

The major object of the invention is to provide such a device which will be light in weight so as not to overburden the rear end of the baler; to utilize for its drive, power and motion already present in the baler for another purpose; to provide intermittent operation of the device during only the momentary period when it is needed; and which motion has desirable characteristics which will minimize strain on the apparatus and damage to the bales; and in which the operator has complete control of the action of the device from his station on the tractor.

Briefly, the device includes an impeller or propeller in the form of an endless conveyor which is normally at rest, but in a position to receive a bale as it is forced out of the rear of the baler by the usual operation thereof, but so oriented that, when activated it will impart motion in the direction of the desired trajectory. When a bale is finished and ready to be thrown, motion is imparted to the impeller by connecting it momentarily with the usual compressing mechanism of the baler so that it is accelerated in accordance with the characteristic sine-wave movement of the baling plunger, the movement being sufficiently rapid to impart the necessary momentum to the bale to throw it the desired distance. The impeller is disconnected from the compressing mechanism at the instant when the velocity of the bale has become sufficient to cause it to travel the distance, and not "overshoot" the wagon, and this point of release is preferably made adjustable from the operator's station so that the bale can be placed where desired in the wagon.

Further objects and advantages will become apparent from the following specification and accompanying drawings, in which:

FIGURE 1 is a right side elevation of a fragment of a baler with the device applied, parts being broken away and others in vertical axial cross section;

FIG. 2 is a horizontal sectional view of a fragment of the same on the line 2—2 of FIG. 1;

FIG. 3 is a right side elevation of a fragment of the baler further forward, and with parts broken away to show a thrower actuating mechanism;

FIG. 4 is a fragmentary plan view of the same;

FIG. 5 is a fragmentary left side elevation of the mechanism shown in FIGS. 3 and 4;

FIG. 6 is a perspective taken from the left and a little ahead of the bale thrower in the nature of a diagram on a reduced scale and with parts omitted, but suitable for illustrating the operation of the device;

FIG. 7 is a right side elevation on a reduced scale of a fragment of a baler equipped with the device and attached to a tractor, showing a control arrangement;

FIG. 8 is an enlarged rear elevation of certain mechanism indicated in FIGS. 1 and 6;

FIG. 9 is a fragmentary end view of the same on the line 9—9 of FIG. 8, parts being broken away to show what lies beneath;

FIG. 10 is a fragmentary sectional view on the line 10—10 of FIG. 8;

FIG. 11 is an enlarged fragmentary right side elevation of certain mechanism indicated in FIGS. 3, 4, and 7;

FIG. 12 is an end view of the same on the line 12—12 of FIG. 11;

FIG. 13 is a fragmentary left side elevation of the same; and

FIG. 14 is an enlarged rear elevation of certain mechanism shown in FIGS. 1 and 6, taken on the line 14—14 of FIG. 1.

As seen in FIGS. 1, 2, and 7, the baler withh which the device is associated includes a bale case 20 constituting the main structural element of the machine, having side walls 22 and 24, and a bottom compressing rail 26.

Walls 22 and 24 have fixed thereto at their upper rear corners, brackets 28 and 30 which carry a cross member 32 connecting the upper edges of the walls. Walls 22 and 24 also have lower brackets 34 and 36 carrying a cross member 38 below rail 26. Cross member 32 has journaled therein a pivot pin 40 which is preferably vertically aligned with a pivot pin 42 fixed in relation to the lower cross member 38. Pivot pin 40 is fixed in relation to a cross member 44 forming part of the framing generally designated as 46 of the bale throwing mechanism or unit 48. In similar manner, pin 42 has journaled thereon a bearing bracket 50 fixed in any suitable manner, to a down-turned section of a deck portion 52 of mechanism 48 so that the latter is supported on pins 40 and 42 and is capable of swinging, as indicated in FIG. 2, from side to side about pins 40 and 42. In this way, unit 48 may be maintained by suitable mechanism hereinafter referred to, in properly aimed relation to a trailing wagon so that bales projected by the mechanism will not go astray.

It will be noted that deck 52 and rail 26 of the baler are disposed substantially on a level with each other, so that a bale in the act of being pressed out of chamber 20 will readily bridge the gap between rail 26 and deck 52 and slide along the latter for further processing.

Side wings 54 and 56 are hinged to vertical members 58 and 60 carried respectively on brackets 28–34, and 30–36. These substantially close the space between side walls 22 and 24 and side walls 62 and 64 respectively of unit 48. Wings 54 and 56 prevent the bales from swelling in the space between the two units, and more particularly serve to guide the the bales into the throwing mechanism when the latter is displaced to one side, as indicated in dotted lines in FIG. 2. This would be the case when the baler and trailing wagon were negotiating a turn.

The baler is pulled by a drawbar 68, FIG. 7, fixed in any suitable manner to the forward end of the baler and attached to the drawbar 70 of a tractor, generally designated as 72. Tractor 72 has a seat 74 defining an operator's station, and it also has the other essential structures, not necessary to further describe, and actuates a power take-off shaft 76 of well-known type which drives a flywheel 78 actuating the plunger of the baler. In the present instance, flywheel 78 drives a small gear or pinion 80 actuating a large gear 82 fixed on a shaft 84 with which is fixed a crank 86. A pitman 88 is pivotally connected to plunger 92 in any suitable or well-known manner as by a pin 93 (see FIG. 3), and causes reciprocating movement thereof of a character closely approaching what might be termed a sine-wave motion.

It will be understood that expedients of well-known type are present, but unnecessary to show and describe, for introducing fibrous material in position to be compressed by plunger 92, and suitably tied. The material is then forced rearwardly, eventually into unit 48 in the form of a bale to be thrown into a wagon.

The throwing mechanism

Deck 52 is of a width corresponding to bale case 20, extends rearwardly and has a portion 94, FIG. 1, extending rearwardly and upwardly and substantially coextensive with an endless conveyor, generally designated as 96, extending rearwardly and upwardly. Deck portion 94 continues at a steeper angle and has an opening 98 through which flights 100 may extend above the deck and engage a bale as it is forced rearwardly by the action of the baling plunger 92, as hereinbefore described.

Conveyor 96 is preferably in the form of a chain 101 carried on a sprocket 102 at its upper end, and on an idler sprocket 104 at its lower end. Sprocket 104 is pivoted on a journal or pin 106 which may be shifted by means of an adjusting bolt 108 in order to tension chain 101. Bolt 108 may be duplicated on the other side of unit 48, and has a nut 109 which may be used to shift the bolt, and pivot 106. Sprockets 102 and 104, together with chain 101 and flights 100 operate in a relatively narrow casing 110 depending from deck portion 94, and serving as a structural member and as an enclosure for the conveyor parts.

As so far described, a bale emerging from chamber 20 will slide along deck 32 and upwardly along deck portion 94 into engagement with one of the flights 100 on conveyor 96, propelling the latter until it has progressed to the point of engagement of several, for example 3, of the flights 100. At this point, conveyor 96 becomes activated as will appear, and accelerates the bale in the general direction of conveyor 96 to a velocity at which it will be projected beyond the conveyor and deck portion 94 a desired distance.

Considerable force is necessary to accelerate a bale to such a velocity, and to prevent the bale from rising out of contact with flights 100, or possibly being torn by a slipping action, a hold-down shoe 111 is disposed generally parallel to but spaced upwardly from conveyor 96 and deck portion 94 to be in sliding engagement with the upper surface of the bale during its engagement with conveyor 96. Shoe 111 comprises a relatively smooth metal member of a width somewhat less than the bale and having upturned and inturned edges 112, as best seen in FIG. 14. Shoe 111 has a considerably wider portion 113 which is journaled on a cross member 114, FIG. 1, fixed in any suitable manner with brackets as 116, carried on frame member 46. Cross member 114 has an upstanding bracket 118 carrying a trunnion block 120 through which extends an adjusting rod 122. Rod 122 is inclined and spaced from shoe 111 and has a nut 124 engaging trunnion block 120 so as to tension rod 122 to support shoe 111 when bales are not present. By adjusting nut 124 the position of rod 122 can be controlled. Rod 122 is connected in any suitable manner at 126 with shoe 111. Adjusting of nut 124 will therefore cause swinging of shoe 111 up or down about cross member 114 so as to adjust the downward pressure of shoe 111 against a bale being thrown by the mechanism.

The drive

As stated, conveyor 96 is activated from the compressing mechanism but only during the momentary periods when a bale is to be thrown. For this purpose, it is connected, as will appear, with plunger 92 so as to partake of a portion of the sine-wave movement of the plunger.

Turning to FIGS. 3 to 6, plunger 92 has a forward extension 128, preferably in the form of a downwardly open channel member at one side of bale case 20 so as to avoid interference with pitman 88 or crank 86, and which carries a pin or latch portion 130 disposed transversely to the plunger movement. Pin 130 therefore describes a reciprocating motion corresponding to that of plunger 92. A hook or latch portion 132 may engage pin 130 and partake of this motion, as will appear.

Hook 132 is pivoted as by a pin 134 to a pull rod 136 slidable in a bearing or guide 138 fixed in any suitable manner with wall 24.

Rod 136 is also guided in a bearing 140 and is preferably square or angular in cross section so that hook 132 will be maintained in relation to be engaged when desired by pin 130. Rearwardly from guide 140, rod 136 is connected by means of a plate 142 with a pull rod 144 located centrally of bale chamber 20 beneath rail 26. Rod 44 connects through a clevis 146 with a pull rod 148 which extends farther rearwardly to the region of above-mentioned pivot pin 42. Rod 148 connects, through a fitting 150, FIG. 2, with a chain 152 which propels conveyor 96 whenever it is pulled by rods 148, 144, and 136 by reason of engagement of hook 132 with pin 130.

Chain 152 extends rearwardly past pin 42 and over an idler sprocket 154 journaled on a pin 156 carried in the framing of unit 48 and about what may be termed a windlass sprocket 158, best seen in FIGS. 8, 9, and 10. Sprocket 158 is fixed on a shaft 160 arranged crosswise of unit 48 and journaled in bearings 162 and 164 carried respectively in a bracket portion 166 within housing portion 110, and a wall portion 168 of unit 48. Shaft 160 is thereby ruggedly supported to withstand the considerable pull of chain 152. Chain 152 in the FIG. 9 position of the parts wraps about sprocket 158 through the major part of its circumference, and is fixed at its end to the sprocket on a pin 170. A pull on chain 152 will therefore rotate sprocket 158 throughout part of a revolution, the sprocket then being reversed, as will appear, so that the chain is wound back onto the sprocket. Shaft 160 drives through a sprag type or other suitable overrunning clutch 172 a sprocket 174 journaled on shaft 160, and driving through a chain 176 a sprocket 178 journaled on a shaft 180 suitably supported in framing 46. Sprocket 178 is fixed in relation to a sprocket 182 of a greater diameter than sprocket 178, the latter driving, through a chain 184, a sprocket 186 located at the upper end of conveyor 96 and fixed on a shaft 188. Above-mentioned sprocket 102 constituting part of conveyor 96 is fixed on and receives its drive from shaft 188.

It will now be apparent that a part revolution of sprocket 158 caused by a pull on chain 152 will cause similar rotation of sprockets 178 and 182, and increased rotation of sprocket 186. Rotation of sprocket 186 causes rotation of sprocket 102 and actuation of conveyor 96, and the ratios are such that a full unwrap of chain 152 from windlass sprocket 158 will cause sufficient movement of conveyor 96 to impart the maximum desired impetus to a bale engaged with flights 100. Chain 176 has a tightener roller 190 of the usual or suitable type and chain 184 is provided with a tightener 192 carried on an arm 194 supported from above-mentioned cross member 114.

The return mechanism

Shaft 160 has a helical type spring 196 disposed thereabout and anchored at one end on a pin 198 to a wall 200 forming part of above-mentioned narrow casing 110. At the other end it is anchored on a pin or boss 202 fixed on shaft 160. Spring 196 is so oriented as to be "wound up" during the pulling movement of chain 152 so that, as soon as the parts are released, it will rotate shaft 160 in the reverse direction and restore chain 152 to the wrapped position, shown in FIG. 9. This is permitted without interference from conveyor 96 by reason of overrunning clutch 172.

Clutch 172, as best seen in FIG. 9, comprises an inner member or race 204 fixed on shaft 160 and driving through a plurality of sprags 206, an outer shell or race portion 208 journaled on shaft 160 and fixed in relation to above-mentioned sprocket 174. Other types of overrunning clutches are suitable for this service, but in the present instance, clockwise rotation of inner race 204 in FIG. 9 will be transmitted through sprags 206 to shell 208, and thence to sprocket 174. This corresponds to the unwrapping movement of chain 152 and actuates conveyor 96. Upon release of hook 132 and reverse movement of race 204 by spring 196, sprags 206 release and permit reverse rotation of race 204 while shell 208 may stop or continue rotation by reason of momentum of the parts without interference with the rewinding action of spring 196 on chain 152.

This action also comes into play between bale throwing movements as the bale is relatively slowly pressed outwardly onto conveyor 96, the parts being free to move under the pressure of the bale, since shell 208 may rotate freely until the bale is well engaged with flights 100, after which conveyor 96 comes into action and forcefully and rapidly propels the bale.

Shaft 160 has a finger 210 fixed thereon and which comes to rest, at the end of the retracting movement caused by spring 196, on an abutment pin 212 carried on a bracket 214 fixed to a wall portion 216 forming a part of framing 46. This determines a normal or home position for shaft 160 and its attached parts.

*The trip mechanism*

Hook 132 is engaged with pin 130 by the action of a bale as it moves into position to be thrown by the mechanism. For this purpose, a sensing device or trigger 218 mounted on hold-down shoe 111 is journaled in upstanding brackets 220, as shown in FIGS. 1 and 14. Trigger 218 has downwardly extending fingers 222 and 224 extending generally downwardly on either side of shoe 111 into the path of a bale sliding along the underside of the latter. Trigger 218 also has a downwardly directed U-shaped portion 226 between brackets 22 to which is attached a tension spring 228. A bale passing rearwardly and upwardly in FIG. 1 will therefore eventually engage fingers 222 and 224 and cause rocking of the trigger in a clockwise direction. Such movement will exert a pull on spring 228 and on a chain 230 attached to spring 228. Chain 230 is guided beneath abovementioned cross member 114 and extends through an opening 232 in an upward extension of above-mentioned pin 40. In this way, chain 230 is guided for straight backward movement regardless of the side swinging of unit 48.

Chain 230 connects with a pull rod 234 which extends forwardly above bale case 20, and is pivotally connected to an upstanding lever arm 236 (see also FIGS. 3 and 4). Lever arm 236 is fixed in relation to a rockshaft 238 journaled transversely on bale case 20 and having a generally forwardly extending lever arm 240, at the left side of bale case 20, and lever arm 240, as best seen in FIG. 5, is pivoted to a generally vertical pull rod or link 242 which extends downwardly and is pivotally connected to a lever arm 244. Lever arm 244 is fixed to and extends forwardly from a rockshaft 244 journaled beneath bale case 20 and extending across to the region of hook 132. A lever arm 248 extends generally in the direction of the length of bale case 20, and has a portion 250 which extends beneath hook 132 at a point spaced forwardly from rockshaft 246. It will now be apparent that rearward movement of pull rod 234, through this series of pull rods, lever arms and rockshafts, will tend to raise or swing hook 132 upwardly about its pivot pin 134. A spring 252, FIG. 5, is anchored on wall 22 and connected to pull downwardly on link 242 and lever arm 240 and tends to oppose above-mentioned spring 228, and maintain the parts in position with hook 132 lowered out of the path of reciprocation of pin 130. Under these conditions, pin 130 does not engage hook 132 and the throwing mechanism remains at rest. However, when the trigger 218 is swung rearwardly by an emerging bale, spring 228 pulls on chain 230 and rod 234, raising lever arms 240 and 244 together with lever arm 248, swinging hook 132 into the dotted position of FIG. 3, where it will be encountered by pin 130 on the next rearward reciprocation thereof. Pin 130 will encounter a cam or ramp surface 254 thereby momentarily swinging hook 132 downwardly so that pin 130 may proceed past a lip portion 256 and enter a notch or socket 258 formed in hook 132.

Hook 132 may be forced downwardly in this manner by yielding of spring 228, the resiliency of the spring, however, returning the parts to the dotted position in FIG. 3, virtually instantly as soon as pin 130 has passed lip 256, so that pin 130 is engaged in socket 258. At this point, plunger 92 and pin 130 start their return movement and the pin is solidly lodged in notch 258 by reason of the pull or load on hook 132. To insure against dislodgement, notch 258 is "undercut" slightly beneath lip 256.

As stated, the movement of hook 132 and rod 136 and its attached parts starts the throwing movement of the bale, but it will be observed that pin 130 becomes lodged in hook 132 substantially at the rearmost limit of the travel or plunger 92 so that the pin is momentarily stationary, and then starts its forward movement with a gradual acceleration, characteristic of the sine-wave movement hereinbefore mentioned. There is, therefore, no serious impact or shock load imposed on any of the parts.

After the desired amount of movement has been imparted to rod 136 and thence to conveyor 96, ramp portion 254 of hook 132 encounters a stationary trip pin 260, which rocks hook 132 downwardly about pin 134 and disengages it from pin 130. In the meantime, the bale has traversed conveyor 96 and been thrown entirely clear of unit 48 so that the trip mechanism has been returned to its inactive position assisted by spring 252.

As heretofore stated, helical spring 196, FIG. 8, opposes the motion of rod 136 by opposing rotation of shaft 160, and, as soon as hook 132 is released, causes reverse rotation of shaft 160, thereby winding chain 152 on sprocket 158 and bringing the parts to "home" position with finger 210 resting on stop pin 212. The mechanism then remains inactive until it is time to throw another bale.

Trip pin 260 is adjustable in position so that the point at which hook 132 is released may be varied at will. This construction is best shown in FIGS. 11 and 13. An open-sided box-like housing 262 is fixed to lower flange 264 of side wall 24, and has downwardly extending end portions 266 and 268. Journaled in end portions 266 and 268 and extending generally in the direction of travel of the tractor is a threaded element 270. A collar 272 secures element 270 against endwise movement in one direction by engagement with end portion 268 and a washer 274 engaged with end portion 268, secures element 270 against endwise movement in the other direction. A similar washer 276 in engagement with portion 266 may assist collar 272 if desired. Threaded on element 270 is a nut member 278 to which is fixed, in the present instance below element 270, above-mentioned pin 260. Pin 260 is braced in position substantially normal to element 270 by means of a gusset plate 280, and pin 260 is retained against downward displacement by means of a lower plate or floor 282 fixed between end portions 266 and 268. Preferably, floor 282 is wider than portions 266 and 268 and extends beneath pin 260 to furnish a surface on which it can slide and at the same time be ruggedly supported. Above floor 282 is a flange 284 constituting part of an inner wall 286 extending between end portions 266 and 268, completing the generally box shape of housing 262 and supporting pin 260 against the substantial upward force developed when hook 132 strikes it at the desired point in its forward movement.

A coupling 288 connects screw element 270 with a shaft 290 which, as better seen in FIG. 7, extends to the forward end of bale case 20. At this point, a universal joint 292 connects shaft 290 with an extension shaft 294 disposed at an angle to shaft 290 and extending to a point within easy reach of an operator on seat 74. Shaft 294 is supported in a suitable bearing 296, supported on an extension post 298 fixed in any suitable manner to drawbar 68. Post 298 is preferably adjustable in height in order to place shaft 294 within convenient reach of such an operator. Shaft 294 preferably is formed in the shape of a crank 300, or otherwise has provision for rotation when desired. By rotating crank 300, nut portion 278 is caused to travel along threaded element 270 so as to adjust the position of pin 260. In this manner, hook 132 may be caused to disengage from pin 130 at any desired point in the reciprocation of plunger 92, the point of release determining the maximum velocity attained by conveyor 96, and accordingly by the bale being thrown.

*Provision for swinging*

As hereinbefore stated, unit 48 may swing side to side about pivot pins 40 and 42, and this may be effected by any suitable mechanism, as a guide arm 302, pivotally connected to brackets 303, suitably bolted or otherwise connected to housing portion 110, and which may be connected with a trailing wagon. However, plunger 92 from which the throwing mechanism gets its power does not swing side to side.

To permit such swinging without disturbing the transfer of power to thrower 48, chain 152 is placed with its pivot pins 302 substantially vertical so that the chain may bend in a horizontal plane. Chain 152, as best seen in FIG. 2, travels between guide rollers 304 and 306 journaled on pins 308 and 310 which are placed on either side of chain 152 and slightly forwardly of pivot pin 42 so that chain 152, as unit 48 swings to the side, will bend substantially exactly on the center line of pivot 42. With this arrangement, swinging of unit 48 will cause no appreciable change in the effective length of chain 152 so that the timing of the throwing operation and the action of the device will not be affected to any perceptible degree by such swinging of the thrower to one side or the other. Neither will the pull of chain 152 have any appreciable effect on the swinging of unit 48.

It will be noted that chain 152, where it engages idler 154 must bend in a vertical plane, and for this purpose, chain 152 has a special link 312 having spaced hinge pins at right angles to each other so that chain 152, to the right of special link 312 may be bent in a horizontal plane, while the portion to the left of link 312 in FIG. 1, may be bent in a vertical plane. The proportions are such that special link 312 will not reach idler sprocket 154 when the parts are moved to home position, and neither will it reach rollers 304 and 306 upon maximum travel of chain 152 in the opposite direction to actuate conveyor 96.

It is contemplated that the portion of chain 152 between special link 312 and pull rod 148 may be of a type which may bend in any direction, since it is not required to cooperate with a sprocket. It is also contemplated that rollers 304 and 306 may be sprockets meshing with chain 152.

Fingers 222 and 224 are retained in position transverse to shoe 111 against the pull of spring 228 by stops or abutments 314, one of which is cut away in FIG. 14. Each has a pad portion 316 fastened to shoe 111 by a bolt 318 engaged between a flange 320 and one of above-mentioned upturned edges 112. In this way, fingers 222 and 224 are prevented from retracting under the urging of spring 228, beyond the required position.

*Operation*

The operation of the device is thought to be clear from the foregoing, but to summarize, the hay or fibrous material is compressed within a bale case 20 by the action of plunger 92 in well-known manner, the finished bales after tying being relatively slowly pressed out through the rear end of bale case 20. They then pass on to deck 52, guided by wings 54 and 56, and on into engagement with the flights 100 of conveyor 96. Conveyor 96 is readily propelled by the bales by virtue of overrunning clutch 172 so that the particular bale to be thrown may become engaged with several of the flights 100. After this has occurred, triggers 222 and 224 are pressed rearwardly by the emerging bale and, through spring 228 and its attached linkage, raise hook 132 into position to become engaged with pin 130 which is continuously carried back and forth by the reciprocation of plunger 92.

Once engaged, hook 132 is pulled by the next retracting or forward reciprocation of plunger 92 and, through pull rod 136 and pull rods 144 and 148 exerts a pull on chain 152. Movement of the latter causes rotation of sprocket 158, winding or tightening of spring 196 and, through overrunning clutch 172, rotation of sprocket 174 and its attached parts. Rotation of sprocket 174, through the motion-multiplying drive constituted by chains 176 and 184, causes prompt and rapid action of conveyor 96 in order to throw the bale in engagement with flights 100 out of the apparatus in the general direction of conveyor 96.

A rail or shoe 111 is engaged with the upper surface of the bale to insure contact thereof with flights 100.

At a predetermined point in the forward reciprocation of plunger 92 (when hook 132 is engaged with pin 130), hook 132 is disconnected by the action of trip pin 260 so that pull rod 136 may be returned in a rearward direction by the action of spring 196, reversing the rotation of shaft 160. This action may take place without reversing conveyor 96, since sprocket 174 is driven through overrunning clutch 172 and is therefore not connected with shaft 160 during such reverse rotation. Furthermore, while shaft 160 and sprocket 158 may reverse very quickly upon tripping of hook 132, conveyor 96 and the motion transmitting and increasing drive may have appreciable momentum and may tend to continue running for a few seconds after hook 132 is disconnected, and the driving force to conveyor 96 is interrupted. Overrunning clutch 172 comes into play also in this situation, since, by virtue of it, sprocket 174 may continue to run freely in the normal direction of rotation even with shaft 160 stationary, or rotating in a reverse direction.

The point at which hook 132 is released by the action of trip pin 260 may determine the velocity which the mechanism and the bale will reach. For this reason, trip pin 260 is adjustable in position to act on hook 132 at any desired point in the retracting movement of plunger 92. Normally, tripping of hook 132 would take place, at the latest, at a point of maximum retracting velocity of plunger 92, and the proportions would be such that under these conditions, a bale would be thrown to or slightly beyond the farthest desirable point. Adjusting pin 260 rearwardly or toward the position of hook 132, shown in FIG. 3, would cause earlier release of the hook and less velocity in the bale being thrown. The position of trip pin 260 is adjusted from the operator's station on the tractor by turning crank 300, and it is thus possible to control the throwing of the bales to load whatever part of the wagon is desired.

The bale throwing mechanism may swing side to side in order to throw the bales accurately into a trailing wagon, even when the outfit is negotiating a curve, and by virtue of the guide rollers 304 and 306, the operation of the bale thrower from the action of the plunger is not affected by such swinging or misalignment of the baler and throwing mechanism.

Such swinging is effected by the guide arm 302 which is fixed on housing portion 110 against side to side movement, and connected with any suitable trailing wagon, not shown.

It is to be understood that expedients forming no part of the present invention may be used for pulling such a wagon from the baler, or the wagon may be propelled in any desired manner, not necessary to show and describe.

Variations on the foregoing invention will, no doubt, occur to those skilled in the art; for example, other means might be used for actuating conveyor 96 momentarily when desired, and other means might be used for conveying the motion of plunger 92 to conveyor 96, and it is to be understood that all such means are contemplated as within the scope of the invention, insofar as defined in the claims.

What is claimed as new and desired to be secured by Letters Patent of the United States is:

1. In a baler, means including an
endless conveyor positioned for throwing bales formed by the baler in a desired path, and means connected with said endless conveyor and constituted to start said conveyor
only at such times as a bale is ready to be thrown, and stop said conveyor after such bale has been thrown.

2. In a baler of the type having a reciprocating plunger, means including an
endless conveyor positioned for throwing bales formed by the baler in a desired path, and reciprocating means connected with said endless conveyor and with said
plunger in position to be reciprocated by said plunger for actuating said conveyor by reason of the reciprocating movement of said plunger.

3. In a baler of the type having a reciprocating plunger, means including an
endless conveyor positioned for throwing bales formed by the baler in a desired path, means connected with said endless conveyor and with said
plunger for actuating said conveyor by reason of the reciprocating movement of said plunger and disconnectible from said plunger, and
means for connecting the actuating means to the plunger when a bale is ready to be thrown.

4. In a baler of the type having a reciprocating plunger, means including an
endless conveyor positioned for throwing bales formed by the baler in a desired path, means connected with said endless conveyor and with said
plunger for actuating said conveyor by reason of the reciprocating movement of said plunger and disconnectible from said plunger,
means for connecting the actuating means to the plunger when a bale is ready to be thrown and
means for disconnecting the actuating means from the plunger at desired points in the reciprocating movement of the plunger.

5. In a bale thrower of the type adapted to receive a bale as it emerges from a baler and project said bale in a desired free path, the combination of a
support,
an endless conveyor operatively carried on the support,
means guiding an emerging bale onto the conveyor, and
driving means for starting the conveyor, driving the conveyor in the direction to project a bale, and stopping the conveyor when the bale has been projected.

6. In a bale thrower of the type adapted to receive a bale as it emerges from a baler and project said bale in a desired free path, the combination of a
support,
an endless conveyor operatively carried on the support,
means guiding an emerging bale onto the conveyor,
driving means for starting the conveyor, driving the conveyor in the direction to project a bale, and stopping the conveyor when the bale has been projected, and
means activated by the emergence of a bale and arranged to initiate the operation of said driving means.

7. In a bale thrower of the type adapted to receive a bale as it emerges from a baler and project said bale in a desired free path, the combination of a
support,
an endless conveyor operatively carried on the support,
means for driving said endless conveyor cyclically at a speed which accelerates from zero to maximum, and decelerates to zero, in a direction to project a bale,
means guiding an emerging bale onto the conveyor, and
means activated by the emergence of a bale and arranged to initiate a cycle of operation of said driving means.

8. In a bale thrower of the type adapted to receive a bale as it emerges from a baler and project said bale in a desired free path, the combination of a
support,
an endless conveyor operatively carried on the support,
means for driving said endless conveyor in a direction to throw a bale, said means being adapted to drive said conveyor in a sries of cyclic periods at speeds which accelerate from zero to a maximum and decelerate to zero,
means guiding an emerging bale onto the conveyor, and
means arranged to initiate a cycle of operation of said driving means, and said conveyor being of a length such that a bale guided onto said conveyor will have been propelled through the length thereof and projected beyond said conveyor substantially at the time said conveyor reaches its maximum speed.

9. In a bale thrower of the type adapted to receive a bale as it emerges from a baler, said baler having a reciprocating plunger and to project said bale in a desired free path, the combination of a
support, an endless
conveyor operatively carried on the support, upwardly directed
pivot means engaged between said baler and said support in position to carry said support on said baler, and about which said support is free to swing from side to side,
means guiding an emerging bale onto said conveyor,
driving means connected with said plunger for intermittently operating the conveyor in the direction to project a bale, and disconnectable therefrom, and
means activated by the emergence of a bale and arranged to connect said driving means with said plunger and start the operation of said conveyor.

10. In a bale thrower of the type adapted to receive a bale as it emerges from a baler, said baler having a reciprocating plunger, and to project said bale in a desired free path, the combination of a
support, an endless
conveyor operatively carried on the support,
upwardly directed pivot means engaged between said baler and said support in position to carry said support on said baler, and about which said support is
free to swing from side to side,
means guiding an emerging bale onto said conveyor, and
driving means connected with said plunger for intermittently operating the conveyor in the direction to project a bale and disconnectable therefrom, and means to connect said driving means with said plunger and start the operation of said conveyor.

11. In a bale thrower adapted to receive a bale as it emerges from a baler of the type having a reciprocating plunger, and to project said bale in a desired free path, the combination of a
support, upwardly directed
pivot means engaged between said baler and said support in position to carry said support on said baler, and about which said support is free to swing from side to side
bale throwing means operatively carried on the support, a flexible element connected to actuate said bale throwing means when pulled in one direction,
means to connect said flexible element to said plunger when it is desired to operate said bale throwing means, and said flexible element being positioned to
extend substantially through and transverse to the axis of said pivot means, whereby the pull of said plunger on said flexible element is prevented from exerting any turning effort on said support so that said support is free to swing from side to side without interference from the pull of said plunger on said flexible element.

12. In a bale thrower adapted to receive a bale as it emerges from a baler of the type having a reciprocating plunger, and to project said bale in a desired free path, the combination of a
support, upward directed
pivot means engaged between said baler and said support in position to carry said support on said baler, and about which said support is free to
swing from side to side,
an endless
conveyor operatively carried on the support, a flexible element connected to actuate said conveyor when pulled in one direction,
means to connect said flexible element to said plunger when it is desired to operate the conveyor, and said flexible element being positioned to
extend substantially through and transverse to the axis of said pivot means, whereby the pull of said plunger on said flexible element is prevented from exerting any turning effort on said support so that said support is free to swing from side to side without interference from the pull of said plunger on said flexible element.

13. In a bale thrower adapted to receive a bale as it emerges from a baler of the type having a reciprocating plunger, and to project said bale in a desired free path, the combination of a
support, a first
latch element on said plunger,
guide means supported in fixed relation to said baler adjacent said first latch element, a
second latch element guided for reciprocation by said guide means in a direction corresponding to the reciprocations of said plunger, a
windlass element on said support, a
flexible element connected with said second latch element and trained about said windlass element, whereby to rotate said windlass element by reason of reciprocation of said plunger when said first latch element is engaged with said second latch element, an
endless conveyor operatively carried on said support,
transmission means arranged to impart the rotation of said windlass to said endless conveyor, means incorporated in said transmission means whereby said endless conveyor may overrun said transmission means,
resilient means connected with said transmission means and conditioned to resist rotation of said windlass element in the direction necessary to drive said endless conveyor and to rotate said windlass element in the reverse direction when permitted, to rewind said flexible element on said windlass element,
means on said support positioned to guide a bale emerging from the baler onto said endless conveyor,
means activated by the emergence of a bale, arranged to cause engagement of said latch elements with each other, and
means arranged to disengage said latch elements at a predetermined point in the reciprocation of said plunger.

14. A device according to claim 13, having shiftable means to disengage said latch elements at desired points in the reciprocation of said plunger.

15. In a bale thrower of the type adapted to receive a bale as it emerges from a baler and project said bale in a desired free path, the combination of a
support,
an endless
conveyor operatively carried on the support,
means for driving said endless conveyor cyclically at a continuously increasing acceleration from zero to a maximum speed, and decelerating to zero, in a direction to project a bale,
means guiding an emerging bale onto the conveyor, and
means activated by the emergence of a bale and arranged to initiate a cycle of operation of said driving means.

16. In a bale thrower of the type adapted to receive a bale as it emerges from a baler and project said bale in a desired free path, the combination of a
support,
an endless
conveyor operatively carried on the support,
means for driving said endless conveyor in a direction to throw a bale, said means being adapted to drive said conveyor in a series of cyclic periods at a continuously increasing acceleration from zero to a maximum speed and decelerating to zero,
means guiding an emerging bale onto the conveyor, and means arranged to initiate a cycle of operation of said driving means, and said conveyor being of a length such that a bale guided onto said conveyor will have been propelled through the length thereof and projected beyond said conveyor substantially at the time said conveyor reaches its maximum speed.

17. In a bale thrower adapted to receive a bale as it emerges from a baler of the type having a reciprocating plunger, and to project said bale in a desired free path, the combination of a
support, upwardly directed
pivot means engaged between said baler and said support in position to carry said support on said baler, and about which said support is free to
swing from side to side,
an endless
conveyor operatively carried on the support, a shoe positioned substantially parallel to said endless conveyor carried on said support in a position opposed to said conveyor to maintain a bale in contact with said conveyor, a flexible element connected to actuate said conveyor when pulled in one direction,
means to connect said flexible element to said plunger when it is desired to operate the conveyor, and said flexible element being positioned to
extend substantially through and transverse to the axis of said pivot means, whereby the pull of said plunger on said flexible element is prevented from exerting any turning effort on said support so that said support is free to swing from side to side without interference from the pull of said plunger on said flexible element.

18. In a baler, means including an endless conveyor positioned for throwing bales formed by the baler in a desired path, a shoe positioned substantially parallel to said endless conveyor in a position opposed to said conveyor to maintain a bale in contact with said conveyor, and means connected with said endless conveyor and constituted to start said conveyor only at such times as a bale is ready to be thrown, and stop said conveyor after such bale has been thrown.

References Cited by the Examiner

UNITED STATES PATENTS

| | | | |
|---|---|---|---|
| 3,043,418 | 7/62 | Morrison et al. | 198—128 |
| 3,087,600 | 4/63 | Richey | 198—128 |
| 3,090,508 | 5/63 | Muth et al. | 198—128 X |
| 3,142,393 | 7/64 | Shepley | 198—128 X |

WALTER A. SCHEEL, *Primary Examiner.*

LOUIS O. MAASSEL, *Examiner.*

Notice of Adverse Decision in Interference

In Interference No. 95,303 involving Patent No. 3,198,106, R. B. Skromme, AGRICULTURAL IMPLEMENT, final judgment adverse to the patentee was rendered Feb. 29, 1968, as to claims 1, 5, 6, 7 and 15.

[*Official Gazette July 2, 1968.*]

Disclaimer 3,198,106.—*Robert B. Skromme*, Elmhurst, Ill. AGRICULTURAL IMPLE-
MENT. Patent dated Aug. 3, 1965. Disclaimer filed Apr. 23, 1968, by
the assignee, *J. I. Case Company*.

Hereby enters this disclaimer to claims 1, 5, 6, 7 and 15 of said patent.
[*Official Gazette October 8, 1968.*]